Nov. 30, 1954 H. C. FLINT 2,695,658
SPRING SUPPORTING CLIP HAVING LOCKING TONGUE
Filed April 19, 1949 2 Sheets-Sheet 1
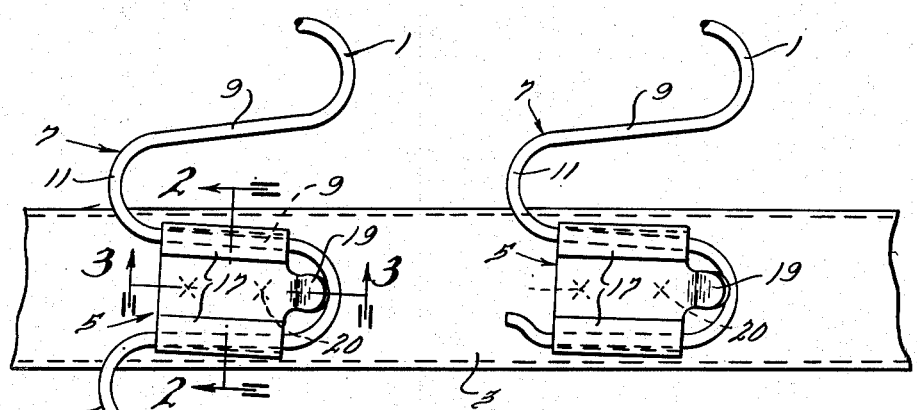
Fig. 1.
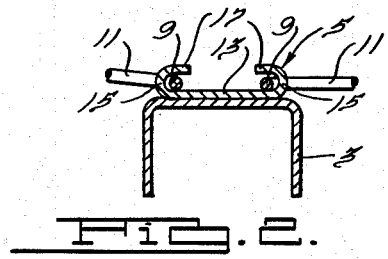
Fig. 2.
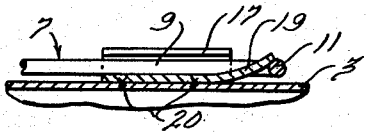
Fig. 3.
Fig. 5.
Fig. 4.
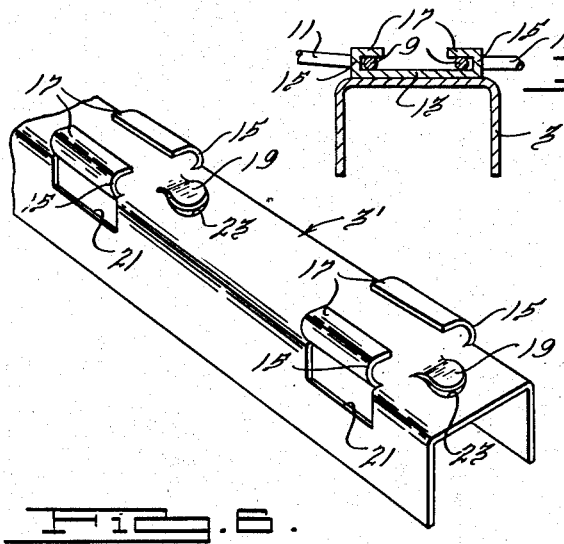
Fig. 6.
INVENTOR.
Hyland C. Flint.
BY
Barnes, Dickey & Pierce
ATTORNEYS

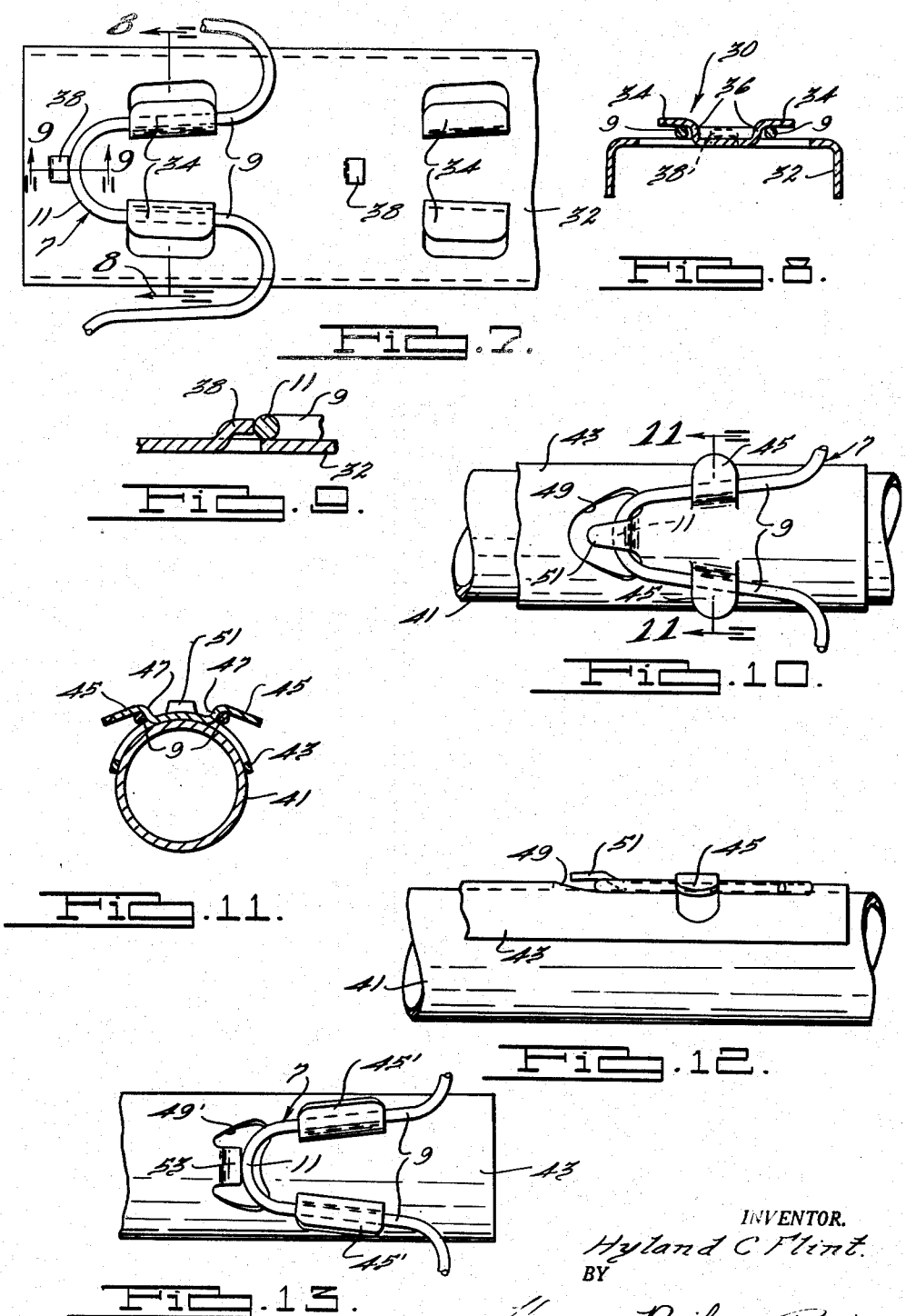

United States Patent Office

2,695,658
Patented Nov. 30, 1954

2,695,658

SPRING SUPPORTING CLIP HAVING LOCKING TONGUE

Hyland C. Flint, Birmingham, Mich., assignor to American Metal Products Company, Detroit, Mich., a corporation of Michigan Application April 19, 1949, Serial No. 88,293

4 Claims. (Cl. 155—179)

This invention relates to spring constructions which embody a plurality of pre-arched sinuous or zig-zag spring strips of the type disclosed and claimed in Kaden Reissue Patent No. 21,263 and, in particular, refers to a clip construction for securing such spring strips to frame members.

An object of the invention is to provide a clip construction which may be either separately fabricated and then attached to the frame member or formed in the frame member itself. It is a further object to provide a clip of this type which may be fabricated by press operations thereby making it relatively inexpensive to manufacture.

Another object is to provide an attachment clip for springs of the type mentioned which non-pivotally secures them to the frame member and which further secures them in such a manner as to prevent longitudinal or lateral shifting relative to the frame member.

An additional object is to provide a clip to which the springs may be attached by a simple snap action and wherein resilient engagement helps to maintain interconnection between the clip and spring and thereby obviating the necessity for permanent deformation of the clip such as required with hog rings and other types of fastening devices.

These and other objects and advantages of the invention are achieved by the present clip construction in which a pair of spaced ears are provided to overlie adjacent rectilinear portions of the sinuous spring loops and anchor them to the frame member while a nib of the clip construction engages the arched spring portion interconnecting the rectilinear portions to prevent sidewise or lateral shifting of the spring strip. Preferred embodiments of the clip construction are shown by way of illustration in the accompanying drawings in which:

Figure 1 is a plan view of one form of clip showing a plurality thereof as employed to attach spring strips to a frame member;

Fig. 2 is a section taken on line 2—2 of Fig. 1;

Fig. 3 is a section taken on line 3—3 of Fig. 1;

Fig. 4 is a perspective view of the clip shown in Figs. 1–3;

Fig. 5 is a section similar to that of Fig. 2 of a modified form of clip construction;

Fig. 6 is a perspective view showing the clip construction of Figs. 1–4 formed in the frame member;

Fig. 7 is a plan view of a modified form of clip construction formed as a part of a frame member;

Fig. 8 is a cross section taken on line 8—8 of Fig. 7;

Fig. 9 is a cross section taken on line 9—9 of Fig. 7;

Fig. 10 is a plan view of another form of clip construction wherein a plurality of clips are formed in a single member which is adapted to be attached to a tubular frame member;

Fig. 11 is a cross section taken on line 11—11 of Fig. 10;

Fig. 12 is a front elevation of the structure shown in Fig. 10; and

Fig. 13 is a plan view of a modification of the form of the invention illustrated in Figs. 10–12.

In Figs. 1–5 are illustrated a plurality of sinuous spring strips 1 which are secured to the web of the channel-type frame member 3 by means of clips 5. For the sake of description of this invention, the sinuous strips 1 will be regarded as comprising a plurality of loops 7, each loop consisting of spaced, rectilinear legs 9 joined by arched portions 11 which face in opposite lateral directions in adjacent loops. The clip 5 has a web portion 13, the sides of which are bent into upright tabs 15 and the latter are provided with inwardly extending flanges or ears 17. The tabs are spaced apart by a distance substantially equal to or slightly less than the width of a loop 7 so that when the clips 5 are secured to the frame member 3, as by welds 20, the loops 7 will fit snugly between the tabs to prevent pivoting of the spring strip and the ears 17 will overlie the rectilinear spring portions 9 to prevent upward movement of the spring strip 1 relative to the frame member 3. The ears 17 may be spaced above the web 13 by a distance slightly greater than the thickness of the strip as shown in Fig. 2 or, as shown in Fig. 5, they may be spaced slightly less than the strip thickness so that upon insertion of a loop 7 they are elastically deformed upwardly and therefore resiliently hold the loop 7 in engagement with the web 13.

A nib or tongue 19 extends laterally outwardly and upwardly from the web 13 of the clip 5. This tongue serves to lock the strip to the web 13 of the clip by pressing the loop thereagainst and also preventing by abutment with the arched portion 11 undesired withdrawal of the strip from the clip. In securing the strip to the frame member 3 by means of the clip, the desired loop is inserted with the arched portion 11 first between the web 13 and ears 17 at the end of the clip opposite tongue 19. As the strip is pushed laterally into the clip, the arched portion 11 rides up the top surface of the tongue 19 until it passes over the top edge whereupon it snaps beneath it as shown in Fig. 3 to be resiliently held thereby against upward and withdrawal movement.

It is evident from Fig. 6 that the clip construction shown in Figs. 1–5 may be readily formed as an integral part of the frame member 3′, which, like member 3, may be a channel or any other structural shape capable of ready fabrication. In this embodiment, the member 3′ is properly slit at 21 and the slit portions bent around to form the tabs 15 and ears 17. The tongue 19 is formed in a similar manner by upward bending of a portion isolated by the slit 23. These operations may be most readily formed in a flat piece of stock and after they are completed, the sides thereof may be bent along suitable lines, for example, the base line of the tabs 15, to form the legs of the channel 3′.

In the modification of Figs. 7–9, the clip construction 30 is formed in the web of the frame member 32 in a manner generally analogous to that described in conjunction with Fig. 6. In this construction the ears 34 extend outwardly with respect to their tabs 36 rather than inwardly as in the preceding embodiment represented by clip 5. It will thus be evident that the open end of the loop 7 is inserted in the clip 30 first and that the rectilinear portions 9 engage the outside of the tabs 36 rather than inside as before. A nib 38 is upwardly struck from the channel 32 and is spaced from the ends of the tabs 34 so that upon insertion, the arched portion 11 rides up over it and then snaps down into abutting engagement therewith as shown in Fig. 9. In the present embodiment the tabs and ears are slightly convergent to conform to convergence of the spring legs 9 and the nib 38 is located so that the loop 7 will be snugly fitted against the tabs 36 when the arched portion is in abutment therewith, this location preferably being such that a slight spreading of the adjacent spring portions 9 takes place whereby they resiliently grip the tabs. The ears 34 may also be spaced above the member 32 in such a manner that they resiliently hold the rectilinear portions 9 against the member.

Figs. 10–12 show a modified form which is particularly useful for securing sinuous springs to cylindrical frame members, such as the member 41. In this embodiment the clip constructions are formed in a separate member 43 which is curved to fit the contour of the member 41 and then attached thereto as by welding. The ears 45 of this embodiment extend outwardly, though they could extend inwardly as already described, and the tabs 47 are elevated sufficiently so that the heels of the bends between the tabs 47 and ears 45, i. e., top edges of the tabs, lie on a plane or surface conforming to that defined by a loop 7. Thus, it is not necessary that the loops 7 be conformed to the frame member 41. Slightly beyond the end of each pair of tabs and ears, the member 43 is provided with a U-shaped cutout 49 and the central remaining portion 51 comprises a locking nib or tongue. This is bent upwardly above the edges of the cutout 49 by an amount which, at the end of the tongue at least, is slightly less than the thickness of the spring strip so that upon insertion of the legs 9 in the ears 45 and the arched portion 11 in the mouth defined by the tongue 51 and the edge of the cutout 49, the end of the tongue 51 will be deflected upwardly and, as shown in Fig. 12, will then return downwardly whereby the tongue 51 engages the arched portion 11 and prevents sidewise movement of the strip in either direction.

The form of the invention shown in Fig. 13 is a modification of that shown in Figs. 10–12. In this case the ears 45' are of greater width and the cutout 49' faces in a reverse direction to provide a nib 53 that prevents sidewise movement of the loop 7 out of the ears by abutment with the outer side of the arched portion 11.

From the foregoing description it will be apparent that the present clip construction may be readily manufactured and also provides a simple but secure means for attaching sinuous springs to a frame member. Inasmuch as the forms illustrated are capable of modification, it is not intended to restrict the invention thereto.

What is claimed is:

1. Means for attaching sinuous spring strips to an object, said strips having loops consisting of longitudinally spaced, substantially rectilinear portions joined by arched portions, comprising a member providing a surface to engage one side of a loop of the sinuous strip, upright tabs on the same side of said surface having longitudinally extending ears bent therefrom in position to extend over the rectilinear portions of a loop when supported by said member and a tongue at the end of said member adapted to engage the arched portion of a loop after it is passed thereover whereby to prevent sidewise or lateral movement of the strip.

2. Means for attaching sinuous spring strips to an object, said strips having loops consisting of longitudinally spaced, substantially rectilinear portions joined by arched portions, comprising a member providing a surface to engage one side of a loop of the sinuous strip, upright tabs on the same side of said surface having longitudinally and inwardly extending ears spaced above the surface by substantially the thickness of a spring strip, said tabs being spaced apart by substantially the length of the loop as measured by the distance between the rectilinear portions whereby a loop of the spring strip may fit therebetween and be held against movement away from the surface by said ears, and a tongue beyond the end of said member on a center line between said tabs which is adapted to engage the arched portion of a loop when moved thereover to lock the loop within the member against movement therefrom.

3. Means for attaching sinuous spring strips to an object, said strips having loops consisting of longitudinally spaced, substantially rectilinear portions joined by arched portions, comprising a member providing a surface to engage one side of a loop of the sinuous strip, upright tabs on the same side of said surface having longitudinally and outwardly extending ears spaced above the surface by substantially the thickness of a spring strip, said tabs being spaced apart by substantially the length of the loop as measured by the distance between the rectilinear portions whereby said tabs may fit between the rectilinear portions of said loop and said ears may prevent movement of the loop away from the surface, and a tongue forwardly of said member which is adapted to engage the arched portion of a loop when moved thereover to lock the loop within the member against movement therefrom.

4. Means for attaching sinuous spring strips to an object, said strips having loops consisting of longitudinally spaced, substantially rectilinear portions joined by arched portions, comprising a member providing a surface to engage one side of a loop of the sinuous strip, upright tabs on the same side of said surface having longitudinally extending ears spaced above the surface by substantially the thickness of a spring strip, said tabs being spaced apart by substantially the length of the loop as measured by the distance between the rectilinear portions, and a tongue at the end of said member having a portion spaced above said surface by a distance substantially equal to the thickness of a strip and providing a mouth opening outwardly of the tabs for receiving an arched portion of a loop when moved thereover for locking the loop within the member.

References Cited in the file of this patent

UNITED STATES PATENTS

| Number | Name | Date |
| --- | --- | --- |
| 1,794,700 | McCaskey | Mar. 3, 1931 |
| 2,072,562 | Lee | Mar. 2, 1937 |
| 2,224,824 | Krakauer | Dec. 10, 1940 |
| 2,244,469 | Menge | June 3, 1941 |
| 2,249,031 | Neely | July 15, 1941 |
| 2,251,049 | Haberstump | July 29, 1941 |
| 2,257,633 | Bank | Sept. 30, 1941 |
| 2,260,190 | Neely | Oct. 21, 1941 |
| 2,293,566 | Shanahan | Aug. 18, 1942 |
| 2,463,110 | Johnson | Mar. 1, 1949 |
| 2,542,458 | Bank | Feb. 20, 1951 |
| 2,593,831 | Bank | Apr. 22, 1952 |